US012626974B2

(12) United States Patent
Choi et al.

(10) Patent No.: US 12,626,974 B2
(45) Date of Patent: May 12, 2026

(54) SECONDARY BATTERY

(71) Applicant: Samsung SDI Co., Ltd., Yongin-si (KR)

(72) Inventors: Woo Hyuk Choi, Yongin-si (KR); Sung Gwi Ko, Yongin-si (KR); Myung Seob Kim, Yongin-si (KR); Hyun Ki Jung, Yongin-si (KR); Gwan Hyeon Yu, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 565 days.

(21) Appl. No.: 18/160,903

(22) Filed: Jan. 27, 2023

(65) Prior Publication Data

US 2023/0238616 A1 Jul. 27, 2023

(30) Foreign Application Priority Data

Jan. 27, 2022 (KR) ......................... 10-2022-0012600

(51) Int. Cl.
 H01M 50/107 (2021.01)
 H01M 50/152 (2021.01)
 (Continued)

(52) U.S. Cl.
 CPC ....... H01M 50/107 (2021.01); H01M 50/152 (2021.01); H01M 50/167 (2021.01); (Continued)

(58) Field of Classification Search
 CPC ............. H01M 50/107; H01M 50/152; H01M 50/167; H01M 50/179; H01M 50/183;

H01M 50/188; H01M 50/3425; H01M 50/55; H01M 50/557; H01M 50/559; H01M 50/193; H01M 50/159; H01M 50/171;
 (Continued)

(56) References Cited

U.S. PATENT DOCUMENTS

| | | | |
|---|---|---|---|
| 8,993,141 B2 | 3/2015 | Kim et al. | |
| 11,088,429 B2 | 8/2021 | Lee et al. | |

(Continued)

FOREIGN PATENT DOCUMENTS

| | | | |
|---|---|---|---|
| CN | 103262291 A | 8/2013 | |
| CN | 104868065 A | 8/2015 | |

(Continued)

OTHER PUBLICATIONS

Extended European Search Report issued in corresponding EP Application No. 23153647.5, dated Sep. 6, 2023, 7 pages.

(Continued)

*Primary Examiner* — Eugenia Wang

(74) *Attorney, Agent, or Firm* — Womble Bond Dickinson (US) LLP

(57) ABSTRACT

A secondary battery includes: a cylindrical case; an electrode assembly accommodated in the cylindrical case and including a positive electrode and a negative electrode; and a cap assembly sealing the cylindrical case. The cap assembly includes: a cap-up electrically connected to the positive electrode; a terminal plate coupled to an upper portion of the cap-up and electrically connected to the negative electrode; and a first insulating gasket between the cap-up and the terminal plate.

10 Claims, 4 Drawing Sheets

(51) Int. Cl.

| | |
|---|---|
| *H01M 50/167* | (2021.01) |
| *H01M 50/179* | (2021.01) |
| *H01M 50/183* | (2021.01) |
| *H01M 50/188* | (2021.01) |
| *H01M 50/342* | (2021.01) |
| *H01M 50/55* | (2021.01) |
| *H01M 50/557* | (2021.01) |
| *H01M 50/559* | (2021.01) |

(52) U.S. Cl.

CPC ....... *H01M 50/179* (2021.01); *H01M 50/183* (2021.01); *H01M 50/188* (2021.01); *H01M 50/3425* (2021.01); *H01M 50/55* (2021.01); *H01M 50/557* (2021.01); *H01M 50/559* (2021.01)

(58) Field of Classification Search

CPC ............. H01M 50/176; H01M 50/184; H01M 50/186; H01M 10/0585; H01M 10/0422; H01M 10/052; Y02E 60/10

See application file for complete search history.

(56) References Cited

U.S. PATENT DOCUMENTS

| | | |
|---|---|---|
| 11,695,179 B2 | 7/2023 | Bae |
| 2013/0216870 A1 | 8/2013 | Kim et al. |
| 2014/0045000 A1 | 2/2014 | Kim |
| 2015/0010793 A1* | 1/2015 | Yokoyama ........ H01M 10/0587 |
| | | 429/53 |
| 2015/0236334 A1 | 8/2015 | Lee et al. |
| 2017/0301899 A1 | 10/2017 | Lee et al. |
| 2017/0338463 A1* | 11/2017 | Sugaya ................. H01M 4/587 |
| 2020/0083494 A1 | 3/2020 | Bae |
| 2022/0085463 A1* | 3/2022 | Suzuki ................ H01M 50/564 |
| 2024/0322406 A1* | 9/2024 | Haraguchi .......... H01M 50/588 |

FOREIGN PATENT DOCUMENTS

| | | |
|---|---|---|
| CN | 109997244 A | 7/2019 |
| EP | 2 626 925 A2 | 8/2013 |
| EP | 2 696 387 A1 | 2/2014 |
| EP | 3 547 392 A1 | 10/2019 |
| JP | 2012-155957 A | 8/2012 |
| JP | 2019-030016 A | 2/2019 |
| KR | 10-2009-0062541 A | 6/2009 |
| KR | 2014-0020482 A | 2/2014 |
| KR | 10-2016-0144016 A | 12/2016 |
| KR | 2018-0057362 A | 5/2018 |
| KR | 10-2159974 B1 | 9/2020 |

OTHER PUBLICATIONS

Chinese Office Action issued in corresponding Patent Application No. CN 202310087632.5, dated Mar. 28, 2026, 9 pages.

\* cited by examiner

SECONDARY BATTERY

CROSS-REFERENCE TO RELATED APPLICATION

This application claims priority to and the benefit of Korean Patent Application No. 10-2022-0012600, filed on Jan. 27, 2022, in the Korean Intellectual Property Office, the entire content of which is incorporated herein by reference.

BACKGROUND

1. Field

Aspects of embodiments of the present disclosure relate to a secondary battery.

2. Description of the Related Art

Lithium-ion secondary batteries are used as power sources for hybrid vehicles and electric vehicles as well as for portable electronic devices because of, for example, their relatively high operating voltage and relatively high energy density per unit weight.

Secondary batteries may be classified as cylindrical, prismatic, or pouch-shaped secondary batteries according to their shape. For example, a cylindrical secondary battery generally includes a cylindrical case, a cylindrical electrode assembly that is coupled to the case, an (optional) electrolyte that is injected into the case to enable movement of lithium ions, and a cap assembly that is coupled to one side of the case to prevent leakage of the electrolyte and to prevent separation of the electrode assembly.

The above information disclosed in this Background section is for enhancement of understanding of the background of the present disclosure, and therefore, it may contain information that does not constitute prior art.

SUMMARY

Embodiments of the present disclosure provide a secondary battery that facilitates welding with an external device.

A secondary battery, according to an embodiment of the present disclosure, includes: a cylindrical case; an electrode assembly accommodated in the cylindrical case and including a positive electrode and a negative electrode; and a cap assembly sealing the cylindrical case. The cap assembly includes: a cap-up electrically connected to the positive electrode; a terminal plate coupled to an upper portion of the cap-up and electrically connected to the negative electrode; and a first insulating gasket between the cap-up and the terminal plate.

The terminal plate may be electrically connected to the cylindrical case.

The cylindrical case may have a beading part recessed inwardly at a lower part of the cap assembly and a crimping part bent inwardly at an upper part of the cap assembly, and the crimping part may cover a portion of the terminal plate.

The terminal plate may be above an edge of the cap-up and may expose a central portion of the cap-up that protrudes upwardly therefrom.

An area of the terminal plate may correspond to an area of an edge of the cap-up.

The first insulating gasket may be between an edge of the cap-up and the terminal plate, and an area of the first insulating gasket may be larger than that of the terminal plate.

The first insulating gasket may include an extension part extending upwardly and covering a side surface of the terminal plate.

The secondary battery may further include a second insulating gasket between the cap-up and the cylindrical case.

The secondary battery may further include: a vent plate under the cap-up and having a notch; a cap-down under the vent plate and having a plurality of through holes; and an insulator between the vent plate and the cap-down.

The cylindrical case may have a notch in a bottom surface thereof.

DETAILED DESCRIPTION

Figure 1:
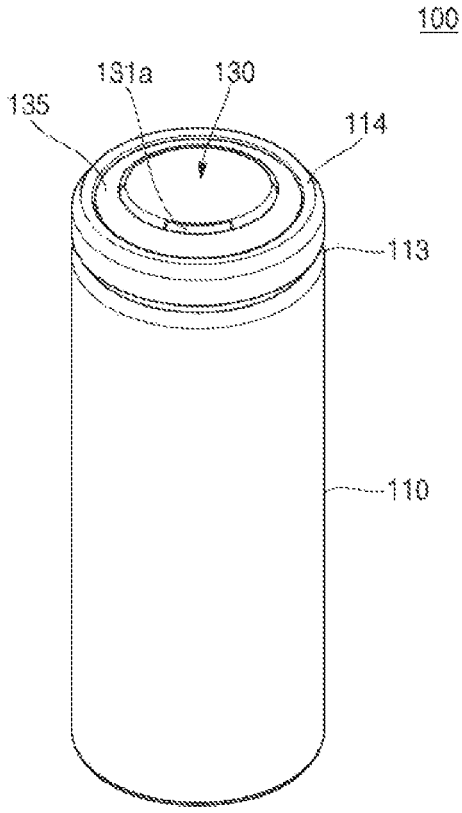
FIG. 1 is a perspective view of a secondary battery according to an embodiment of the present disclosure.

Hereinafter, embodiments of the present disclosure will be described, in detail, with reference to the accompanying drawings.

Embodiments of the present disclosure are provided to more completely explain aspects and features of the present disclosure to those skilled in the art, but the following embodiments may be modified to have various other forms. Thus, the present disclosure may be embodied in many different forms and should not be construed as being limited to the embodiments set forth herein. Rather, these embodiments are provided so that this disclosure will be thorough and complete and will convey the aspects and features of the present disclosure to those skilled in the art.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

In the figures, dimensions of the various elements, layers, etc. may be exaggerated for clarity of illustration. The same reference numerals designate the same elements. As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Figure 2:
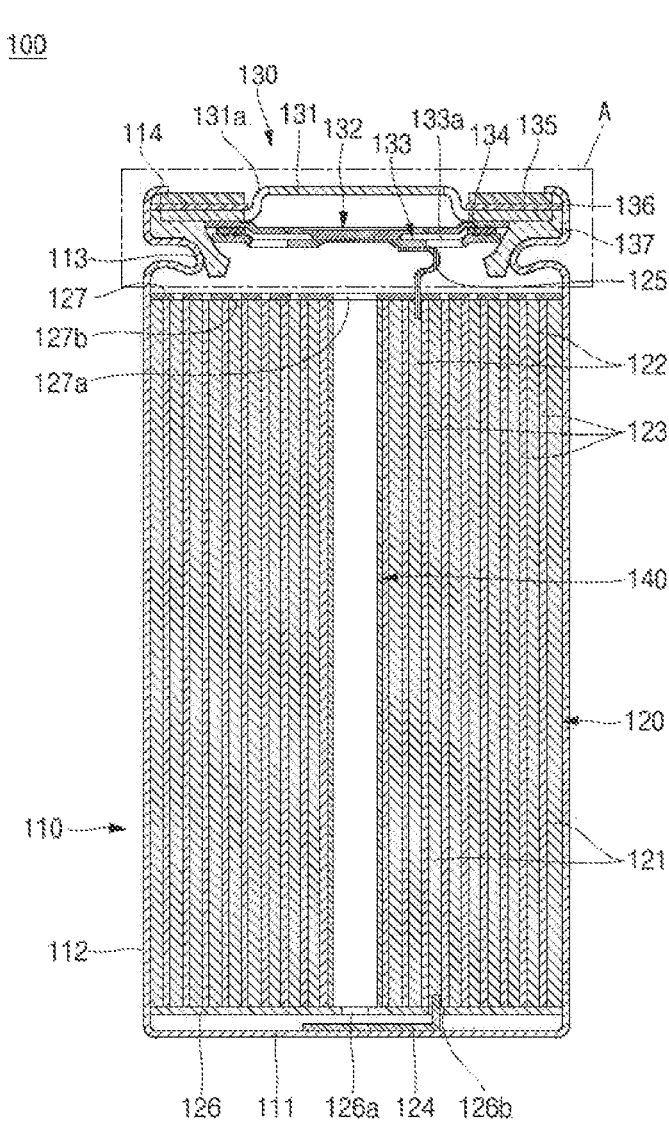
FIG. 2 is a cross-sectional view of the secondary battery shown in FIG. 1.
Figure 3A:
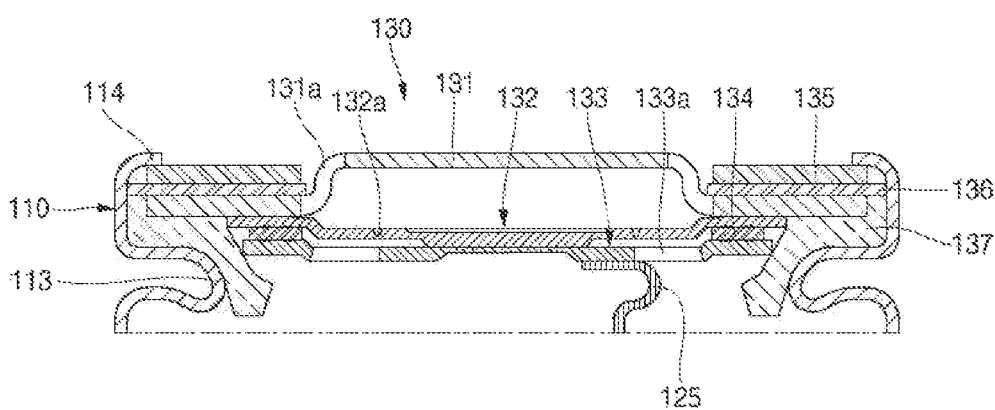
FIGS. 3A and 3B are enlarged cross-sectional views of the portion A of FIG. 2 according to embodiments of the present disclosure.
Figure 3B:
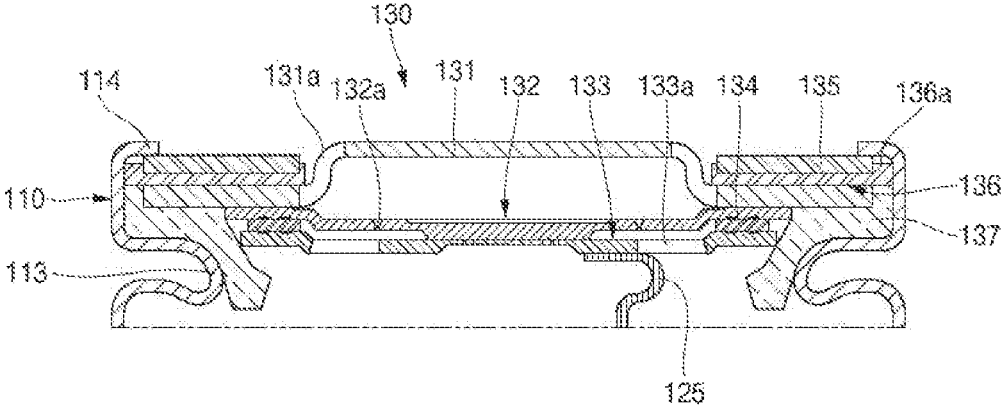

FIG. 1 is a perspective view of a secondary battery according to an embodiment of the present disclosure. FIG. 2 is a cross-sectional view of the secondary battery shown in FIG. 1. FIGS. 3A and 3B are enlarged cross-sectional views of the portion A of FIG. 2 according to embodiments of the present disclosure.

Referring to FIGS. 1 to 3B, a secondary battery 100, according to embodiments of the present disclosure, may include a cylindrical case 110, an electrode assembly 120, and a cap assembly 130. The cap assembly 130 may include or may be referred to as a cap, a cap group, a cap assembly, a cover, or a lid.

The cylindrical case 110 may have a substantially circular bottom portion 111 and a sidewall 112 extending upwardly (e.g., extending a predetermined length upwardly) from the bottom portion 111. The cylindrical case 110 may include or may be referred to as a can, an exterior material, or a housing.

During the manufacturing process of the secondary battery 100, the top of the cylindrical case 110 may be open (or may be opened). Therefore, during the assembly process of the secondary battery 100, the electrode assembly 120 may be integrated into one structure and inserted into the cylindrical case 110. Further, an electrolyte may be injected into the cylindrical case 110 in a subsequent process.

The cylindrical case 110 may be made of steel, a steel alloy, nickel-plated steel, a nickel-plated steel alloy, aluminum, or an aluminum alloy.

In addition, the cylindrical case 110 may have (e.g., may be processed to have) a beading part (e.g., a bead) 113 recessed inwardly at the lower part of (e.g., below) the cap assembly 130, and a crimping part 114 bent inwardly at the upper part of (e.g., above) the cap assembly 130 to prevent the cap assembly 130 from escaping to the outside.

The electrode assembly 120 may be accommodated inside the cylindrical case 110. The electrode assembly 120 may include or may be referred to as an electrode, an electrode group, or a jelly roll. The electrode assembly 120 may include a negative electrode plate 121 coated with a negative electrode active material (e.g., graphite, carbon, etc.), a positive electrode plate 122 coated with a positive electrode active material (e.g., a transition metal oxide, such as $LiCoO_2$, $LiNiO_2$, $LiMn_2O_4$, etc.), and a separator 123 located (or arranged) between the negative electrode plate 121 and the positive electrode plate 122 to prevent a short circuit therebetween while allowing the movement of lithium ions. The negative electrode plate 121, the positive electrode plate 122, and the separator 123 may be wound in a substantially cylindrical shape. In some embodiments, the negative electrode plate 121 may be a copper (Cu) foil, the positive electrode plate 122 may be an aluminum (Al) foil, and the separator 123 may be polyethylene (PE) or polypropylene (PP).

A negative electrode tab 124 that protrudes and extends downwardly (e.g., extends downwardly a certain length) from the electrode assembly 120 may be welded to the negative electrode plate 121, and a positive electrode tab 125 that protrudes and extends upwardly (e.g., extends a certain length upwardly) from the electrode assembly 120 is welded to the positive electrode plate 122. In addition, the negative electrode tab 124 may be copper (Cu) or nickel (Ni), and the positive electrode tab 125 may be aluminum (Al).

The negative electrode tab 124 of the electrode assembly 120 may be welded to the bottom portion 111 of the cylindrical case 110. In such an embodiment, the cylindrical case 110 acts as a negative electrode. In some embodiments, the negative electrode tab 124 may be ultrasonically or laser welded to the bottom portion 111 of the cylindrical case 110. In other embodiments, however, the positive electrode tab 125 may be welded to the bottom portion 111 of the cylindrical case 110, and in such an embodiment, the cylindrical case 110 may act as a positive electrode.

A first insulation plate 126 coupled to the cylindrical case 110 and having a first hole (e.g., a first opening) 126a at the center thereof and a second hole (e.g., a second opening) 126b outside of the first hole 126a (e.g., away from a center of the first insulation plate 126) may be interposed between the electrode assembly 120 and the bottom portion 111 of the cylindrical case 110. In some embodiments, the first insulation plate 126 prevents the electrode assembly 120 from electrically contacting the bottom portion 111 of the cylindrical case 110. In some embodiments, the first hole 126a allows a gas to quickly move upwardly through a center pin 140 when a large amount of gas is generated due to an abnormality in the secondary battery, and the second hole 126b allows the negative electrode tab 124 to pass through the first insulation plate 126 to be welded to the bottom portion 111.

A second insulation plate 127 coupled to the cylindrical case 110 and having a first hole (e.g., a first opening) 127a at the center thereof and a plurality of second holes (e.g., a plurality of second openings) 127*b* outside thereof (e.g., away from a center of the second insulation plate 127) may be interposed between the electrode assembly 120 and the cap assembly 130. In some embodiments, the second insulation plate 127 prevents the electrode assembly 120 from electrically contacting the cap assembly 130. In some embodiments, the second insulation plate 127 prevents the negative electrode plate 121 of the electrode assembly 120 from electrically contacting the cap assembly 130. In some embodiments, the first hole 127*a* allows the gas to quickly move to the cap assembly 130 when a large amount of gas is generated due to an abnormality in the secondary battery, and one of the second holes 127*b* allows the positive electrode tab 125 to pass therethrough to be welded to the cap assembly 130. The remaining second holes 127*b* allow an electrolyte to quickly flow into the electrode assembly 120 during an electrolyte injection process.

The diameters of the first holes 126*a* and 127*a* of the first and second insulating plates 126 and 127 are smaller than the diameter of the center pin 140, and thus, the center pin 140 is prevented from electrically contacting the bottom portion 111 of the cylindrical case 110 or the cap assembly 130 due to an external impact.

The center pin 140 has a hollow circular pipe shape and may be coupled to approximately the center of the electrode assembly 120. The center pin 140 may be made of steel, stainless steel, aluminum, aluminum alloy, or polybutylene terephthalate (PBT), but the material is not limited thereto. The center pin 140 suppresses (e.g., resists) deformation of the electrode assembly 120 during charging and discharging of the secondary battery 100 and acts as a passage for gas generated inside the secondary battery. In some embodiments, the center pin 140 may be omitted.

The cap assembly 130 may seal an opening in the cylindrical case 110 to protect the electrode assembly 120 from the external environment and, when the internal pressure of the cylindrical case 110 becomes higher than a reference pressure, may be broken (e.g., may burst) to discharge the internal gas in the cylindrical case 110 to the outside. In some embodiments, the cap assembly 130 may also act as a positive electrode terminal.

The cap assembly 130 may include a cap-up 131 having with a plurality of through-holes (e.g., openings) 131*a*, a vent plate 132 installed under the cap-up 131, a cap-down 133 installed under the vent plate 132 and having with a plurality of through-holes (e.g., openings) 133*a*, an insulator 134 interposed between the vent plate 132 and the cap-down 133, a terminal plate 135 installed above the cap-up 131, a first insulating gasket 136 interposed between the terminal plate 135 and the cap-up 131, and a second insulating gasket 137 interposed between the cap-down 133 and the cylindrical case 110.

The cap-up 131 may protruding upwardly (e.g., may have a portion protruding upwardly) at the center thereof to act as a terminal for electrical connection to an external device. In some embodiments, the cap-up 131 may act as a positive electrode terminal. The plurality of through-holes 131*a* provided in the cap-up 131 may discharge internal gas to the outside when an abnormal internal pressure occurs inside the cylindrical case 110 due to overcharging, etc. The cap-up 131 may include or may be referred to as a cap, a conductor plate, a cover, or a lid. In some embodiments, the cap-up 131 may be made of aluminum or an aluminum alloy.

The vent plate 132 may be located under the cap-up 131. In some embodiments, the vent plate 132 may be closely attached to, in contact with, bonded to, or connected to the lower portion of the cap-up 131. For example, the vent plate 132 may be closely attached to, in contact with, bonded to, or connected to an edge (e.g., a periphery) of the cap-up 131 except for the upwardly protruding center of the cap-up 131. In some embodiments, the vent plate 132 may include or may be referred to as a safety vent, a safety plate, a vent, a valve, a thin plate, or a conductor plate. In some embodiments, the vent plate 132 may be made of aluminum or an aluminum alloy.

The vent plate 132 may further include a notch 132*a* having a depth (e.g., a predetermined depth) from the upper surface thereof. In some embodiments, the notch 132*a* may be provided at a position corresponding to the through hole 133*a* of the cap-down 133. In some embodiments, when the internal pressure in the secondary battery 100 is greater than a reference pressure (e.g., is greater than the breaking pressure of the vent plate), the notch 132*a* may be broken (e.g., may burst) due to the internal gas pressure so that the internal gas in the cylindrical case 110 is released to the outside through the through-holes 131*a* in the cap-up 131. Thus, the safety of the secondary battery 100 can be secured.

The cap-down 133 may be closely attached to, in contact with, bonded to, or connected to the lower portion of the vent plate 132. The cap-down 133 may be electrically connected to the electrode assembly 120 via the positive electrode tab 125. The positive electrode tab 125 of the electrode assembly 120 may be welded to the lower surface of the cap-down 133. In some embodiments, the lower surface of the cap-down 133 may be ultrasonically and/or laser welded to the positive electrode tab 125. In some embodiments, the cap-down 133 may be made of aluminum or an aluminum alloy.

In some embodiments, when the internal pressure in the secondary battery 100 is greater than the reference pressure (e.g., is greater than the rupture pressure of the vent plate), the vent plate 132 may be deformed by the internal gas pressure to electrically separate the cap-down 133 and the vent plate 132.

The insulator 134 may be located between the edge of the vent plate 132 and the edge of the cap-down 133. When the vent plate 132 is deformed by internal gas, the insulator 134 may insulate the cap-down 133 and the vent plate 132 from each other. In some embodiments, the insulator 134 may be made of a resin material, such as polyethylene (PE), polypropylene (PP), polyethylene terephthalate (PET), etc., but the material is not limited thereto.

The terminal plate 135 may be positioned above the edge of the cap-up 131. The terminal plate 135 may have a hole (e.g., an opening) formed at the center thereof so that the center of the cap-up 131 that protrudes upwardly therefrom may be exposed to the outside. In some embodiments, the terminal plate 135 may have a ring shape. The terminal plate 135 may be spaced apart from the center of the cap-up 131. In addition, the terminal plate 135 may be insulated from the cap-up 131 by the first insulating gasket 136.

In some embodiments, the area of the terminal plate 135 may correspond to the area of the edge of the cap-up 131. The terminal plate 135 that acts as the negative electrode terminal may be exposed in the same direction as the center of the cap-up 131, which acts as the positive electrode terminal. Accordingly, the secondary battery 100 according to the present disclosure may be easily coupled or welded to the positive electrode and the negative electrode of an external device (or a battery pack).

Referring to FIG. 3A, the first insulating gasket 136 may be interposed between the cap-up 131 and the terminal plate 135 to insulate the cap-up 131 and the terminal plate 135 from each other. The first insulating gasket 136 may have a ring shape in which a hole (e.g., an opening) is formed in the center thereof. In some embodiments, the first insulating gasket 136 may be formed to have a larger area than (e.g., to extend beyond an outer periphery of) the terminal plate 135 and the edge of the cap-up 131.

The lower surface of the first insulating gasket 136 may be in contact with or closely attached to the edge of the cap-up 131 and the second insulating gasket 137, and the upper surface of the first insulating gasket 136 may be in contact with or closely attached to the terminal plate 135. The outer surface of the first insulating gasket 136 may be in contact with or closely attached to the cylindrical case 110.

The first insulating gasket 136 may include or may be referred to as a sealing gasket, an insulator, or a resin. The first insulating gasket 136 may be made of a resin material, such as polyethylene (PE), polypropylene (PP), polyethylene terephthalate (PET), etc., but the material is not limited thereto.

Referring to FIG. 3B, the first insulating gasket 136 may further include an extension part 136a extending upwardly and covering the side surface of the terminal plate 135. The extension part 136a may be located on both inner and outer edges of the first insulating gasket 136 to cover inner and outer surfaces of the terminal plate 135. Thus, the first insulating gasket 136 may prevent the terminal plate 135 from contacting the cap-up 131.

The second insulating gasket 137 may be interposed between the cylindrical case 110, and the cap-up 131, the vent plate 132 and the cap-down 133. The second insulating gasket 137 may cover the outer circumferences of the cap-up 131, the vent plate 132, and the cap-down 133. The second insulating gasket 137 may be made of a resin material, such as polyethylene (PE), polypropylene (PP), polyethylene terephthalate (PET), etc., but the material is not limited thereto.

The second insulating gasket 137 may be in close contact with the beading part 113, and the inner surface of the second insulating gasket 137 may be in close contact with the edges of the cap-up 131, the vent plate 132, and the cap-down 133. In some embodiments, the second insulating gasket 137 may include or may be referred to as a sealing gasket, an insulator, or a resin. The second insulating gasket 137 may be made of a resin material, such as polyethylene (PE), polypropylene (PP), polyethylene terephthalate (PET), etc., but the material is not limited thereto.

Figure 4:
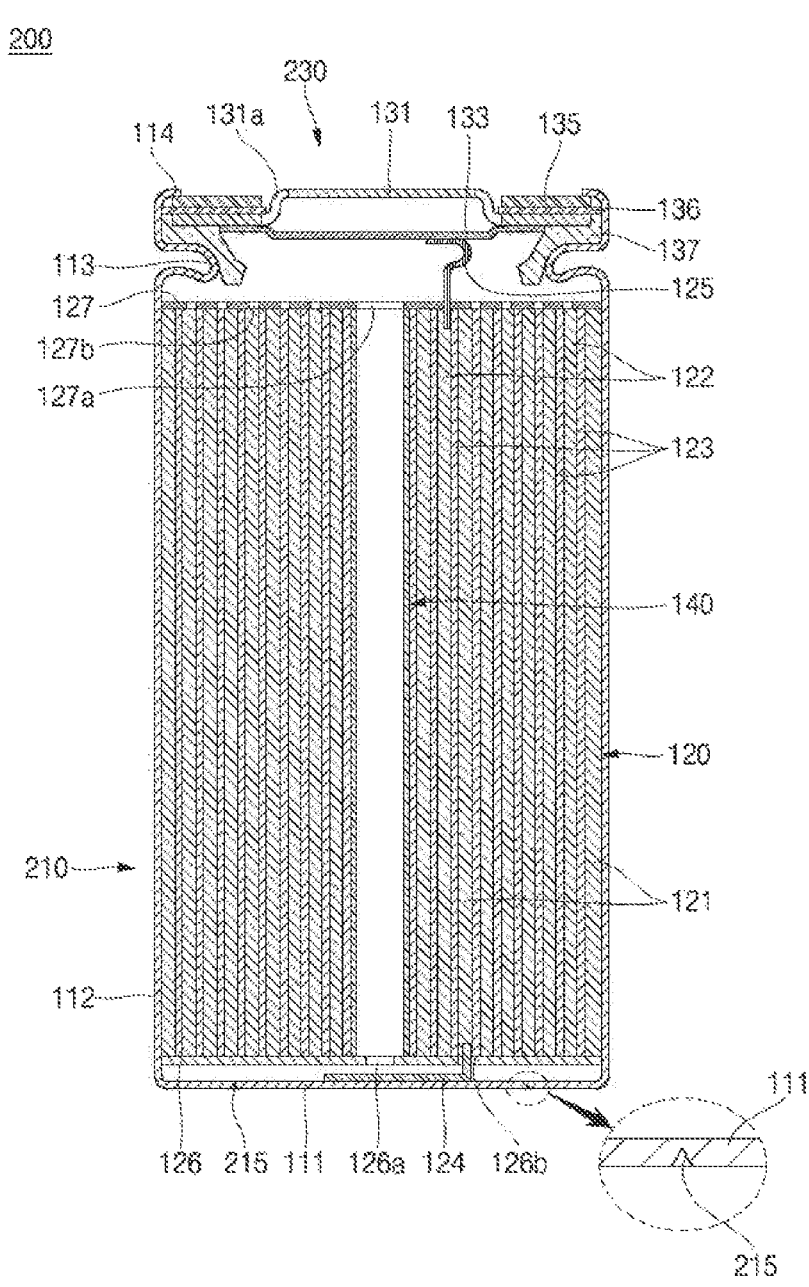
FIG. 4 is a cross-sectional view of a secondary battery according to another embodiment of the present disclosure.

FIG. 4 is a cross-sectional view illustrating a secondary battery according to another embodiment of the present disclosure.

Referring to FIG. 4, the secondary battery 200 according to another embodiment of the present disclosure may include a cylindrical case 210, an electrode assembly 120, and a cap assembly 230.

The cylindrical case 210 may have a substantially circular bottom portion 111, a sidewall 112 extending upwardly (e.g., extending upwardly a certain length) from the bottom portion 111, and a notch 215 provided in the bottom portion 111.

The notch 215 may have a certain depth from the lower surface of the bottom portion 111. In some embodiments, the notch 215 may be provided in the upper surface of the bottom portion 111 or may be provided in both the upper and lower surfaces thereof. The notch 215 may be located outside a portion of the bottom portion 111 at where the negative electrode tab 124 is welded. The notch 215 may be continuously formed on (e.g., around) the bottom portion

111. In some embodiments, the notch 215 may include a plurality of notches 215 formed in the bottom portion 111 at an interval.

In some embodiments, when the internal pressure in the secondary battery 200 becomes higher than a reference pressure, the notch 215 may be broken (e.g., burst) to discharge the internal gas in the cylindrical case 110 to the outside (e.g., to the lower side), and thus, the safety of the secondary battery 200 can be ensured. In addition, when the notch 215 is broken, the negative electrode tab 124 and the sidewall 112 of the cylindrical case 110 may be electrically separated, thereby blocking the current flowing to the terminal plate 135.

The cap assembly 230 may include a cap-up 131 provided having a plurality of through-holes 131a, a cap-down 133 installed under the cap-up 131, a terminal plate 135 installed above the cap-up 131, a first insulating gasket 136 interposed between the terminal plate 135 and the cap-up 131, and a second insulating gasket 137 interposed between the cap-down 133 and the cylindrical case 210.

The cap assembly 230 shown in FIG. 4 may be similar to the structure of the cap assembly 130 shown in FIG. 2 but with the vent plate 132 and the insulator 134 omitted. In the secondary battery 200, instead of the vent plate 132 and the insulator 134, the notch 215 provided in the cylindrical case 210 may act as the vent plate 132 and the insulator 134 in the cap assembly 130 shown in FIG. 2.

As described above, the secondary battery according to embodiments of the present disclosure includes a terminal plate electrically connected to a cylindrical case and installed in the same direction as a cap-up, thereby facilitating welding with an external device.

While the foregoing embodiments are only some embodiments for carrying out the secondary battery according to the present disclosure, which is not limited to these embodiments, it will be understood by a person skilled in the art that various changes in form and details may be made therein without departing from the spirit and scope of the present disclosure as defined by the following claims and their equivalents.

What is claimed is:

1. A secondary battery comprising:
   a cylindrical case;
   an electrode assembly accommodated in the cylindrical case and comprising a positive electrode and a negative electrode; and
   a cap assembly sealing the cylindrical case and comprising:
   a cap-up electrically connected to the positive electrode;
   a terminal plate coupled to an upper portion of the cap-up and electrically connected to the negative electrode; and
   a first insulating gasket between the cap-up and the terminal plate,
   wherein the cylindrical case has a crimping part bent inwardly at an upper part of the cap assembly,
   wherein the crimping part covers a portion of the terminal plate and
   wherein the first insulating gasket is entirely below a side surface of the terminal plate facing toward a center of the cylindrical case.

2. The secondary battery of claim 1, wherein the terminal plate is electrically connected to the cylindrical case.

3. The secondary battery of claim 1, wherein the cylindrical case has a beading part recessed inwardly at a lower part of the cap assembly.

4. The secondary battery of claim 1, wherein the terminal plate is above an edge of the cap-up and exposes a central portion of the cap-up that protrudes upwardly therefrom.

5. The secondary battery of claim 1, wherein an area of the terminal plate corresponds to an area of an edge of the cap-up.

6. The secondary battery of claim 1, wherein the first insulating gasket is between an edge of the cap-up and the terminal plate, and wherein an area of the first insulating gasket is larger than that of the terminal plate.

7. The secondary battery of claim 1, wherein the first insulating gasket comprises an extension part extending upwardly and covering a side surface of the terminal plate nearest to the cylindrical case.

8. The secondary battery of claim 1, further comprising a second insulating gasket between the cap-up and the cylindrical case.

9. The secondary battery of claim 1, further comprising:

a vent plate under the cap-up and having a notch;

a cap-down under the vent plate and having a plurality of through holes; and an insulator between the vent plate and the cap-down.

10. The secondary battery of claim 1, wherein the cylindrical case has a notch in a bottom surface thereof.

* * * * *